(12) United States Patent
Wallen

(10) Patent No.: US 10,259,925 B2
(45) Date of Patent: Apr. 16, 2019

(54) EXPANDABLE TACKY TAPE

(71) Applicant: Matt Wallen, Vail, AZ (US)

(72) Inventor: Matt Wallen, Vail, AZ (US)

( * ) Notice: Subject to any disclaimer, the term of this patent is extended or adjusted under 35 U.S.C. 154(b) by 40 days.

(21) Appl. No.: 14/811,704

(22) Filed: Jul. 28, 2015

(65) Prior Publication Data
US 2016/0032152 A1 Feb. 4, 2016

Related U.S. Application Data

(60) Provisional application No. 62/030,157, filed on Jul. 29, 2014.

(51) Int. Cl.
| | | |
|---|---|---|
| *C09J 109/00* | (2006.01) | |
| *C08J 9/32* | (2006.01) | |
| *B29C 43/00* | (2006.01) | |
| *B29C 53/82* | (2006.01) | |
| *B29C 43/12* | (2006.01) | |
| *B29C 53/72* | (2006.01) | |
| *B29C 53/60* | (2006.01) | |
| *C08K 3/04* | (2006.01) | |

(52) U.S. Cl.
CPC ............... *C08J 9/32* (2013.01); *B29C 43/003* (2013.01); *B29C 43/12* (2013.01); *B29C 53/60* (2013.01); *B29C 53/72* (2013.01); *B29C 53/822* (2013.01); *B29C 53/824* (2013.01); *B29K 2995/0046* (2013.01); *C08J 2201/026* (2013.01); *C08J 2203/22* (2013.01); *C08J 2311/00* (2013.01); *C08J 2323/22* (2013.01); *C08J 2375/00* (2013.01); *C08J 2383/04* (2013.01); *C08K 3/04* (2013.01)

(58) Field of Classification Search
CPC ...... C08J 9/32; C08J 2323/22; C08J 2375/00; C08J 2311/00; C08J 2203/22; C08J 2383/04; B29C 43/12; B29C 43/003; B29C 53/822; B29C 53/60; B29C 53/72; B29C 53/824; B29K 2995/0046
See application file for complete search history.

(56) References Cited

U.S. PATENT DOCUMENTS

| | | | | |
|---|---|---|---|---|
| 4,025,686 A | * | 5/1977 | Zion ..................... | B29C 70/025 264/46.5 |
| 4,921,557 A | * | 5/1990 | Nakamura ............. | B29C 53/564 156/169 |
| 5,259,901 A | * | 11/1993 | Davis .................... | B29C 70/446 156/154 |
| 2012/0024138 A1 | * | 2/2012 | Carberry ............... | F41H 5/0421 89/36.02 |

OTHER PUBLICATIONS http://www.dictionary.com/browse/viscous?s=t.*
http://www.dictionary.com/browse/tacky?s=t.*

* cited by examiner

Primary Examiner — Yogendra N Gupta
Assistant Examiner — Ninh Le
(74) Attorney, Agent, or Firm — David O. Lucas

(57) ABSTRACT

In the manufacture of composite product, raw composite is layered on a shape or form and cured at a higher temperature. With some shapes, it is difficult or impossible to apply sufficient pressure to force and consolidate the composite material to adequately conform to the desired final shape during the curing process. The expandable tacky tape of this invention is comprised of a viscous medium incorporating thermally expandable material. Applied over the raw composite, the expandable tacky tape effectively forces the composite to conform to the desired shape during curing.

6 Claims, No Drawings

EXPANDABLE TACKY TAPE

RELATED APPLICATIONS

This application claims the benefits of U.S. Provisional Application 62/030,157, filed Jul. 29, 2014.

BACKGROUND OF THE INVENTION

Composite plastic parts are of great value in industry because of their high strength and light weight. Tubular, simple, and complex structures are produced by laying on, wrapping, or coating a core mold, form, or mandrel, with the composite plastic and curing the composite at appropriately high temperature.

For some configurations, the composite material must be pressed into areas of the form or mold which is accomplished by placing the form or mold with overlaying composite material into an enclosing bag, followed by vacuum evacuation of the bag so that the outside pressure against the bag forces consolidation of the composite material and conformation with the form or mold shape. Failure to get sufficient consolidation and conformation of the composite into depressed areas of the form or mold results in unacceptable defect in the product.

Bag/breather elongation and bridging deficiencies account for the majority of defect issues in composite curing and is normally due to the fact that the outside consolidation force is not able to make intimate contact with the composite material that is to be consolidated. The insufficient force for compressing (consolidating) composite material in problem areas is mitigated by applying the expandable medium of the present invention to the problem areas so that sufficient pressure is applied during consolidation and curing.

SUMMARY OF THE INVENTION

The expandable tacky tape invention relates to a room temperature high viscosity medium such as butyl rubber or silicone, etc. that serves as a carrier for thermally expandable material such as microspheres or graphite. The thermally expandable microspheres are selected based both on the required expansion volume-duration and also the required temperature-duration that is needed for the material on which it is imparting force. If expandable graphite is utilized, the size and intercalant can be selected to define the expansion volume. Once the thermally expandable material is dispersed in the expansion medium, the material is then applied to difficult to fill or press areas that occur in the processing of plastic materials. When subsequently cured at increased temperature, the expansion within the tacky tape effectively transmits pressure sufficient to consolidate the composite material to adequately conform to the form, mold, or mandrel resulting in the desired product.

DESCRIPTION OF THE INVENTION

The expandable tacky tape of this invention is a material comprised of a high viscosity medium incorporating thermally expandable material, such as thermally expandable microspheres or exfoliating graphite, in sufficient volume to effectively transmit pressure to consolidate composite material to adequately conform to a form or mold when heated and cured.

For example, in an epoxy composite type curing process it is important for the thermal expansion material to apply force as the composite material is heated above 80° C. and then continue to apply force for anywhere from 5 minutes to several hours. The expandable microspheres incorporated in the viscous medium are selected from groups that start to expand anywhere from 70° C. to 220° C. and then also when they pop, depressurize, ranging from 90° C. to 250° C. In addition, the duration that the sphere is expanded can be affected by the wall thickness of the microsphere so that it is able to support the application of force for a longer period, as needed. By selecting both the type of expandable microsphere and the relative concentration that will be added to the high viscosity medium, a controlled volume material is produced that exhibits the desired thermal expansion-duration profile for the required cure cycle.

Selected expandable microspheres are incorporated into a viscous medium such as, but not limited to, butyl rubber or silicone. The concentration of microspheres is sufficient to effectively transmit sufficient pressure to consolidate the composite material to conform to the form or mold when heated under the appropriate curing conditions.

Typically, the mold or mandrel coated with composite and expandable tacky tape applied over selected areas of difficult to achieve conformation is placed into an enclosing bag and vacuum evacuated and sealed. This assembly is then cured at a higher temperature, as appropriate for the composite. The expansion of microspheres during curing transmits sufficient pressure to consolidate the composite and conform the composite to the mold, form, or mandrel.

One embodiment of the invention is comprised of a high viscosity medium such as butyl rubber within which is dispersed more than about 1%, alternatively about 2% or more, EXPANCEL® expandable microspheres by weight. The EXPANCEL® expandable microspheres is selected to activate at about 120° C. and not depressurize until it reaches a temperature of 180° C. The viscous medium containing dispersed EXPANCEL® expandable microspheres is placed over raw fiber reinforced composite that overlays a mandrel. This assembly is placed into a bag, vacuum evacuated and sealed, then placed into a curing oven or autoclave and heated to an appropriate curing temperature in excess of 120° C. and less than about 140° C. The EXPANCEL® expandable microspheres expands during the curing, applying uniform and sufficient pressure on the composite, consolidating and conforming the composite to the mandrel form.

This invention improves the accuracy of conformation to the desired shape and reduces defects in products.

The tacky tape of this invention can include any effective viscous material, including without limitation, butyl rubber, latex, urethane, urea, silicone, neoprene, or other materials known to those skilled in the art.

The tacky tape, in one example, contains heat-expanding microspheres in a concentration of about 0.1 percent to about 60 percent by weight. Depending on the viscosity of the combined viscous material with microspheres, this combination can be applied over the raw composite directly, as caulking, poured on, or sprayed to accomplish a sufficient density of microspheres to be effective.

Exfoliating graphite includes graphite and intercalant. Exfoliating graphite expands at temperatures greater than the transition temperature of the intercalant, typically greater than 185° C.

When the curing temperature for the composite is in excess of 185° C., it may be desirable to utilize exfoliating (expandable) graphite as the thermally expandable material dispersed within the viscous medium. This exfoliating graphite can be combined with the viscous medium over a range of 0.1% to about 1% or more up to about 70% by weight. At greater than 70%, the mixture becomes brittle and difficult to use. The exfoliating graphite is selected based on the use and curing conditions needed. As the graphite loading (content) of the dispersion in viscous medium increases, so does the viscosity of the mixture. A typical concentration would be 30% by weight graphite with 70% butyl rubber or silicone. This tacky tape mixture is placed over the area of composite where it is desired to produce increased pressure on the composite during curing, utilizing a resin barrier that will survive the curing temperature to separate the tacky tape from the composite. Upon heating above the transition temperature of the intercalant, the graphite begins to exfoliate layers of graphite/grapheme and the material expands. This pressure resulting from expansive force of exfoliating graphite to surrounding materials or occupation of a desired volume creates pressure transference from an outer vacuum bag or autoclave.

Depending on the viscosity of the mixture of viscous medium and exfoliating graphite, the mixture can be applied directly, as caulking, poured on, or sprayed on to achieve sufficient density of expandable material to effectively consolidate the composite and to conform the composite as required to the mandrel or form.

Examples are intended to illustrate the invention and are not limiting.

What is claimed:

1. A method of manufacturing a composite product comprised of steps of: a. coating a mandrel or form with a raw composite material, b. applying a viscous material containing thermally expandable material on a surface side of the raw composite material in a selected area of difficult to achieve conformation, said thermally expandable material selected from a group consisting of: expandable microspheres or exfoliating (expandable) graphite, c. placing said mandrel or form coated with said raw composite material and with applied said viscous material containing thermally expandable material into a sealable bag, evacuating air from the sealable bag, and sealing the sealable bag to form a resulting assembly, and d. heating the resulting assembly to expand said thermally expandable material of step b by forcing the raw composite material to conform and consolidate against said mandrel or form and curing the raw composite material.

2. The method of claim 1, wherein said viscous material of step b is selected from a group consisting of: butyl rubber, latex, urethane, urea, silicone, or neoprene.

3. The method of claim 1, wherein said viscous material containing thermally expandable material is applied to the surface of the raw composite material by pouring, spraying, or caulking.

4. A method of transmitting pressure to a composite material to force it to conform to a form, mold, or mandrel and consolidate the composite material to conform to the form, mold, or mandrel comprised of steps of: a. coating a mandrel or form with a raw composite material, b. applying a viscous material containing thermally expandable material on a surface side of the raw composite material in a selected area of difficult to achieve conformation, said thermally expandable material selected from a group consisting of: expandable microspheres or exfoliating (expandable) graphite, c. placing said mandrel or form coated with raw composite material and with applied said viscous material containing thermally expandable material into a sealable bag, evacuating air from the sealable bag, and sealing the sealable bag to form an assembly, and d. heating the assembly to expand said thermally expandable material of step b to transmit pressure to force the raw composite material to conform and consolidate against said form, mold, or mandrel or form and to consolidate the raw composite material to conform to the form, mold, or mandrel and curing the raw composite material.

5. The method of claim 4, wherein the viscous material of step b is selected from a group consisting of: butyl rubber, latex, urethane, urea, silicone, or neoprene.

6. The method of claim 4, wherein said viscous material containing thermally expandable material is applied to the surface of the raw composite material by pouring, spraying, or caulking.

* * * * *